US011431679B2

(12) United States Patent
Lin

(10) Patent No.: US 11,431,679 B2
(45) Date of Patent: Aug. 30, 2022

(54) EMERGENCY COMMUNICATION MANAGER FOR INTERNET OF THINGS TECHNOLOGIES

(71) Applicant: INTERNATIONAL BUSINESS MACHINES CORPORATION, Armonk, NY (US)

(72) Inventor: Forest M. Lin, Hoffman Estates, IL (US)

(73) Assignee: International Business Machines Corporation, Armonk, NY (US)

(*) Notice: Subject to any disclaimer, the term of this patent is extended or adjusted under 35 U.S.C. 154(b) by 202 days.

(21) Appl. No.: 16/185,524

(22) Filed: Nov. 9, 2018

(65) Prior Publication Data
US 2020/0153796 A1 May 14, 2020

(51) Int. Cl.
H04L 9/40 (2022.01)
H04L 12/46 (2006.01)
H04W 4/90 (2018.01)
H04W 12/06 (2021.01)

(52) U.S. Cl.
CPC ...... *H04L 63/0272* (2013.01); *H04L 12/4641* (2013.01); *H04L 63/0861* (2013.01); *H04W 4/90* (2018.02); *H04W 12/06* (2013.01)

(58) Field of Classification Search
CPC ............. H04L 63/0272; H04L 63/0861; H04L 12/4641; H04W 4/90; H04W 12/06; H04W 4/38
See application file for complete search history.

(56) References Cited

U.S. PATENT DOCUMENTS

| 6,662,023 | B1* | 12/2003 | Helle | H04M 1/67 455/558 |
| 7,034,678 | B2* | 4/2006 | Burkley | G01S 5/0027 340/539.13 |
| 7,362,852 | B1 | 4/2008 | Rodkey et al. | |
| 8,380,161 | B2 | 2/2013 | Ewell, Jr. | |
| 8,850,547 | B1* | 9/2014 | Feeser | H04L 63/10 726/9 |
| 8,855,012 | B1* | 10/2014 | Suri | H04L 12/4633 370/254 |

(Continued)

FOREIGN PATENT DOCUMENTS

| CN | 102393993 A | 3/2012 |
| WO | 2007016641 A2 | 2/2007 |

OTHER PUBLICATIONS

IP.com Search Query; Jul. 2, 2020 (Year: 2020).*

(Continued)

*Primary Examiner* — Taghi T Arani
*Assistant Examiner* — Blake I Narramore
(74) *Attorney, Agent, or Firm* — Robert D. Bean

(57) ABSTRACT

According to one embodiment, a method, computer system, and computer program product for managing electronic devices connected to a communications channel is provided. The present invention may include disabling at least one communication channel available at an emergency location in response to receiving a trigger signal from an electronic device, connecting electronic devices to a virtual private network (VPN) established in response to the disabling, and communicating messages pertaining to an emergency situation to the mobile devices of users logged in to the VPN network.

15 Claims, 5 Drawing Sheets

(56) References Cited

U.S. PATENT DOCUMENTS

| | | | |
|---|---|---|---|
| 9,609,120 B2 | 3/2017 | Bennett | |
| 9,699,621 B1 | 7/2017 | Jarrett | |
| 2004/0249250 A1* | 12/2004 | McGee | A61B 5/0002 600/300 |
| 2007/0022481 A1 | 1/2007 | Goldman et al. | |
| 2007/0150720 A1* | 6/2007 | Oh | H04W 12/041 713/153 |
| 2007/0186106 A1* | 8/2007 | Ting | H04L 63/0815 713/168 |
| 2008/0181099 A1* | 7/2008 | Torab | H04L 41/5074 370/216 |
| 2009/0141707 A1* | 6/2009 | Kavanaugh | H04W 76/50 370/352 |
| 2010/0240338 A1* | 9/2010 | Mallick | H04W 76/50 455/404.1 |
| 2012/0218920 A1* | 8/2012 | Varga | H04W 76/50 370/259 |
| 2012/0260313 A1 | 10/2012 | Gomez | |
| 2013/0084825 A1* | 4/2013 | Zhang | H04W 74/08 455/404.1 |
| 2014/0007220 A1 | 1/2014 | Pepin | |
| 2014/0206279 A1* | 7/2014 | Immendorf | H04K 3/41 455/1 |
| 2014/0285341 A1 | 9/2014 | Gitau | |
| 2015/0006695 A1* | 1/2015 | Gupta | H04W 4/70 709/223 |
| 2015/0111524 A1* | 4/2015 | South | H04W 4/021 455/404.2 |
| 2015/0288687 A1* | 10/2015 | Heshmati | G07C 9/257 726/7 |
| 2015/0365381 A1* | 12/2015 | Durbin | H04L 63/0272 726/15 |
| 2016/0044482 A1* | 2/2016 | Stephens, Jr. | G08B 25/016 455/404.2 |
| 2016/0100301 A1* | 4/2016 | Gaurav | H04W 4/12 455/404.2 |
| 2016/0345176 A1* | 11/2016 | DeWitt | H04W 4/027 |
| 2017/0366976 A1* | 12/2017 | Mazzarella | H04L 63/0823 |
| 2018/0115547 A1* | 4/2018 | Peterson | H04L 63/029 |
| 2018/0192278 A1* | 7/2018 | Meredith | H04L 65/1069 |
| 2019/0075465 A1* | 3/2019 | Grutzmacher | H04W 12/08 |
| 2021/0051437 A1* | 2/2021 | Mukherjee | H04L 12/4641 |
| 2021/0126979 A1* | 4/2021 | Ngo | H04L 67/141 |
| 2021/0281992 A1* | 9/2021 | Selanders | H04W 4/80 |
| 2021/0409941 A1* | 12/2021 | Rajendran | H04W 76/34 |

OTHER PUBLICATIONS

STIC search strategy; Jul. 1, 2020 (Year: 2020).*
Partha Pratim Ray et al., "Internet of Things for Disaster Management: State-of-the-Art and Prospects", 2017, IEEE Access, vol. 5 (Year: 2017).*
Francesco Palmieri et al., "A cloud-based architecture for emergency management and first responders localization in smart city environments", 2016, Science Direct, vol. 56 (Year: 2016).*
Mell et al., "The NIST Definition of Cloud Computing", Recommendations of the National Institute of Standards and Technology, NIST Special Publication 800-145, Sep. 2011, 7 pages.

* cited by examiner

EMERGENCY COMMUNICATION MANAGER FOR INTERNET OF THINGS TECHNOLOGIES

BACKGROUND

The present invention relates, generally, to the field of computing, and more particularly to emergency management technology.

Emergency management technology is a field concerned with utilizing technological means to assist in the humanitarian aspects of emergencies, such as by managing the resources and responsibilities of an emergency situation with the goal of reducing the harmful effects of the emergency. Emergency management technology may strive to improve preparedness for, response to, mitigation of, and recovery from a given emergency. In emergencies such as fires, earthquakes, violent attackers, and so forth, emergency management technology may strive to improve communication between individuals on site and emergency responders to allow affected individuals to hide or escape, and allow emergency responders to better identify threats, wounded individuals, or further potential catastrophes. In such situations, speed and accuracy are often the difference between life and death, and the field of emergency management technology continuously strives to refine and innovate.

SUMMARY

According to one embodiment, a method, computer system, and computer program product for managing electronic devices connected to a communications channel is provided. The present invention may include disabling at least one communication channel available at an emergency location in response to receiving a trigger signal from an electronic device, connecting electronic devices to a virtual private network (VPN) established in response to the disabling, and communicating messages pertaining to an emergency situation to the mobile devices of users logged in to the VPN network.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
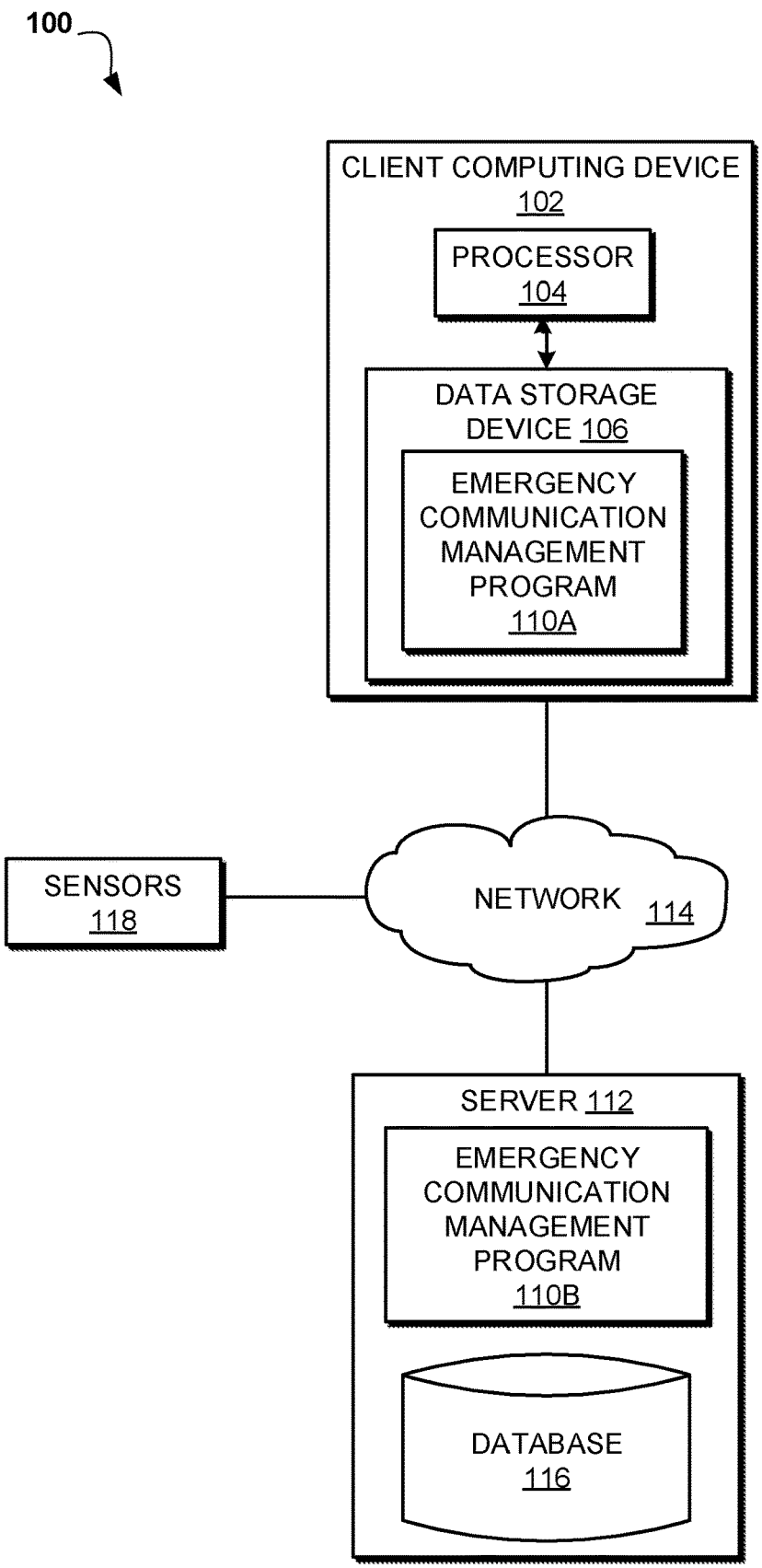
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to emergency management technology. The following described exemplary embodiments provide a system, method, and program product to, among other things, replace local public networks with a localized temporary network that allows efficient intercommunication between affected individuals, on-site devices and sensors, and emergency responders during an emergent event. Therefore, the present embodiment has the capacity to improve the technical field of emergency management technology by providing a means of quickly and efficiently uniting affected individuals, local sensors, and first responders on a single localized private network, allowing efficient intercommunication between affected individuals and first responders, denying communications capabilities and/or remotely accessed information to hostiles, and providing data analytics based on sensor and other information to quickly identify and disseminate crucial information, such as the location of fires, structural weaknesses, potential and/or actual hostiles, casualties, etc.

As previously described, emergency management technology is a field concerned with utilizing technological means to assist in the humanitarian aspects of emergencies, such as by managing the resources and responsibilities of an emergency situation with the goal of reducing the harmful effects of the emergency. Emergency management technology may strive to improve preparedness for, response to, mitigation of, and recovery from a given emergency. In emergencies such as fires, earthquakes, violent attackers, and so forth, emergency management technology may strive to improve communication between individuals on site and emergency responders to allow affected individuals to hide or escape, and allow emergency responders to better identify threats, wounded individuals, or further potential catastrophes. In such situations, speed and accuracy are often the difference between life and death, and the field of emergency management technology continuously strives to refine and innovate.

In the event of an emergency situation, such as an ongoing violent crime or fire, accurate and speedily available information available to both affected individuals and first responders is crucial to saving lives; time is of the essence as any delay puts more lives at risk. Sensors within the area affected by the emergent event have the ability to provide real-time information, as do the mobile devices of affected individuals. Furthermore, denying communications and remote information access to hostile actors may degrade the intercommunication of said hostiles, and limit their escape options, and deny access to helpful remote information, thereby potentially reducing the lethality and aiding a swifter resolution to the emergency. However, the prior art has struggled with denying regular communications to hostile actors while unifying on-site devices quickly and effectively enough to yield significant benefits in emergent situations where a minute's delay may be the difference between life and death. As such, it may be advantageous to, among other things, implement a system that may quickly disable public networks and deploy a virtual private network, allowing vital intercommunication between on-site sensors, the mobile devices of affected individuals, and first responders.

According to one embodiment, the invention may be a holistic solution to real-time emergency management which may, in response to a 911 call or emergency detected by on-site sensors, trigger a facility emergency mode which terminates public cellular or wireless network access within the affected facility. The system may then establish a virtual private network (VPN) at the site of the emergency, and broadcast identifying information for the VPN to allow individuals affected by the emergency to log in. The system may also connect all sensors and attendant computing devices in the emergency zone to the VPN. The system may analyze sensor and device data and any data provided by individuals within the emergency zone to identify important information regarding the emergency, and may communicate this information to users via virtual assistant, mobile device prompt, and/or heads-up display.

An embodiment of the invention is illustrated by means of the following example:

The emergency communication management system is deployed in Little Town, Ill., a town with a population of 8000. Various categories of sensors and devices have been deployed in key city facilities and integrated with the system. The Little Town Grocery Store is outfitted with a CCTV and camera system, as well as infrared temperature transducers within each room of the building which can detect the motion of living objects without taking pictures or videos.

At 3 P M on a Saturday, the Little Town Police Department receives an urgent report of an armed robbery in the Little Town Grocery Store. The police activate the emergency communication management system, which disables public wireless and cell phone service at the grocery store and creates a VPN around the premises. A prompt is sent to the mobile devices of every individual within the store asking them to log in to access the VPN. The VPN log in requires biometric information, such as a fingerprint or picture, to identify the user of the mobile device. Many individuals within the grocery store sign in with their mobile devices; the emergency communication management system locates the signed-in individuals by the position of their mobile device and uses facial recognition to verify that the identity of the signed-in individuals match the biometric information provided to the system. Individuals that match are flagged as possible friendlies. The emergency communication management system identifies that one signed-in individual's identity does not match the provided biometric log-in information. This individual is allowed onto the network so the individual's location may be monitored, but the individual is not given access to alerts and is flagged as a possible hostile.

Using the camera network and image recognition technology, the emergency communication management system recognizes one signed-in individual to be holding a threatening object. This individual is flagged as a possible hostile and is given circumscribed access to the VPN. All signed-in individuals with complete access to the VPN are regularly prompted to report status, and in this way several light casualties are identified as they occur. Thermal transducers indicate movement in two rooms where no mobile devices are signed in; cameras in the first room identify that there are two casualties in the first room, who were unable to sign in using their mobile devices. There are no cameras in the second room to supplement the sensor readings from the thermal transducer; the second room is flagged as possibly containing a hostile. Signed-in individuals far from the potential hostiles are advised to evacuate the grocery store via a prompt on their mobile devices, and a map showing the route is displayed on each mobile device; signed-in individuals near to potential hostiles are advised to hide.

Police arrive on scene; the location of casualties, potential casualties, possible friendlies, and possible hostiles are highlighted on their tablets, and on headsets equipped with augmented reality heads-up displays. Using this information, the second room possibly containing a hostile is investigated via an unmanned vehicle, and is revealed to contain a casualty. Possible hostiles are quickly apprehended, and subsequently casualties are swiftly located and treated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to replace local public networks with a localized temporary network that allows efficient intercommunication between affected individuals, on-site devices and sensors, and emergency responders during an emergent event.

Referring to FIG. 1, an exemplary networked computer environment 100 is depicted, according to at least one embodiment. The networked computer environment 100 may include client computing device 102, a server 112, and sensors 118 interconnected via a communication network 114. According to at least one implementation, the networked computer environment 100 may include a plurality of client computing devices 102, servers 112, and sensors 118 of which only one of each is shown for illustrative brevity.

The communication network 114 may be a virtual private network (VPN) deployed at the site of an emergency, and may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run an emergency communication management program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an emergency communication management program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Sensors 118 may include any electronic devices capable of sensing data and connected to network 114. Sensors 118 may include sensors permanently installed in a facility and connected to network 114, such as thermal transducers, optical and infrared security camera systems, motion sensors, et cetera. Sensors 118 may further include any sensors on mobile devices within the area and connected to network 114, such as biometric wearable devices, cameras, accelerometers, or location sensors on mobile devices such as cell phones, cameras, laser rangefinding sensors and sonar sensors on unmanned vehicles, et cetera.

According to the present embodiment, the emergency communication management program 110A, 110B may be a program enabled to replace local public networks with a localized temporary network that allows efficient intercommunication between affected individuals, on-site devices and sensors, and emergency responders during an emergent event. The emergency communication management program 110A, 110B may be located on client computing device 102 or server 112 or on any other computing device located within network 114. Furthermore, emergency communication management program 110A, 110B may be distributed in its operation over multiple devices, such as client computing device 102 and server 112. The emergency communication management method is explained in further detail below with respect to FIG. 2.

Figure 2:
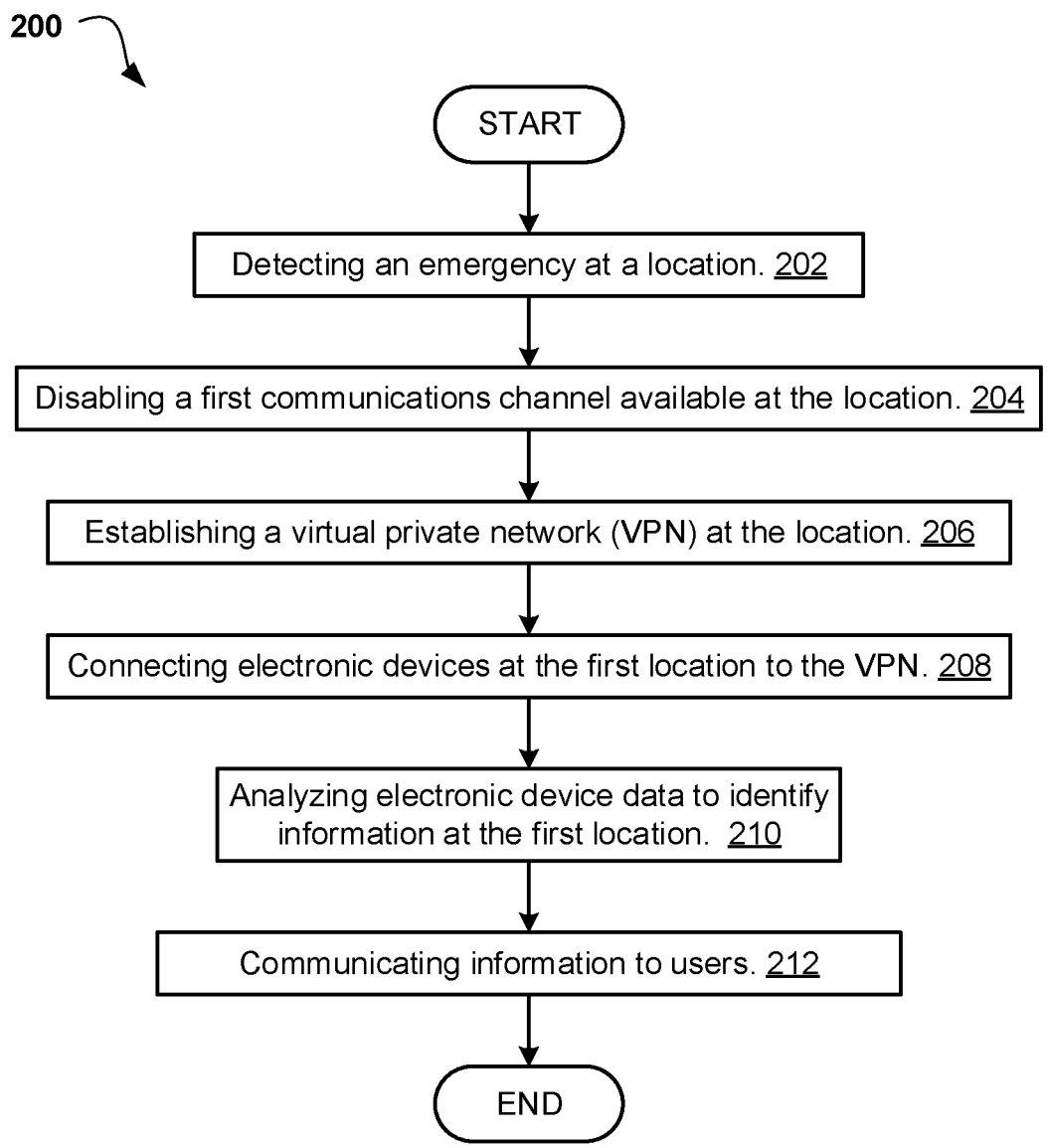
FIG. 2 is an operational flowchart illustrating an emergency communication management process according to at least one embodiment.

Referring now to FIG. 2, an operational flowchart illustrating an emergency communication management process 200 is depicted according to at least one embodiment. At 202, the emergency communication management program 110A, 110B detects an emergency at a location. The emergency communication management program 110A, 110B may detect an emergency at a location automatically by receiving information that may indicate an emergent situation, such as by identifying a sound profile in received audio that corresponds to the sound profile defined as indicative of an emergency, by identifying high levels of carbon monoxide using a carbon monoxide sensor, by registering the presence of heat, smoke, or the heat-activated deployment of sprinkler systems, etc. In other embodiments of the invention, the emergency communication management program 110A, 110B may simply receive a signal to activate, such as from a manual input by first responders, affected individuals, or emergency response agencies, from a sensor, or from an analytics program. The emergency communication management program 110A, 110B may also request manual activation of the system by a human user in response to an automatic determination of the possibility of an ongoing emergency.

At 204, the emergency communication management program 110A, 110B disables a first communications channel available at the location. The emergency communication management program 110A, 110B may disable public wireless internet, cell phone service, or both. While it may be desirable to disable all forms of wireless communication in the event that multiple hostiles are at the emergency location and may be using wireless communications to coordinate among themselves, it may be desirable in other emergency situations, such as fires, gas leaks, floods, etc., and/or situations where the emergency communication management program 110A, 110B is not equipped to set up a sufficiently reliable VPN, to allow cellular service or other wireless services so that affected individuals may, for instance, continue to call family and first responders or look up other information on the internet. The emergency communication management program 110A, 110B may disable wireless communications at the site of the emergency by communicating with wireless network infrastructure at or near the site to remotely disable the infrastructure, or to instruct the infrastructure to block or re-route incoming and outgoing messages associated with the emergency location. In some situations, such as where hostiles are communicating via walkie talkie, the wireless networks may be disabled using signal jammers on likely frequencies.

At 206, the emergency communication management program 110A, 110B establishes a virtual private network at the location. The emergency communication management program 110A, 110B may generate the virtual private network using established on-site infrastructure, such as wireless routers or local cellular towers, or by transporting wireless network infrastructure to the site in a specialized vehicle. The VPN may be deployed across both wireless and wired networks.

At 208, the emergency communication management program 110A, 110B connects electronic devices at the first location to the VPN. The emergency communication management program 110A, 110B may connect one or more electronic devices, previously connected to the at least one communication channel, to a virtual private network (VPN) established in response to the disabling, wherein at least one device on the communication channel does not have access to the VPN. The electronic devices may include mobile devices such as tablets and cell phones held by individuals within the emergency area, sensors within the area, and displays, such as augmented reality headsets worn by first responders. Electronic devices within the VPN may be prompted for authentication information, such as a password, personally identifiable information, et cetera. The authentication method may be modified from non-biometric to biometric identification based on the needs of the situation. For instance, in situations involving hostiles who might be privy to non-biometric authentication information, such as where an office worker is robbing her ordinary place of business where she is a registered employee and has access to company passwords, additional verification may be required; in such a situation, the authentication requirement may be modified from non-biometric to biometric identification, where biometric identification may be any distinguishing biological traits capable of uniquely identifying an individual, such as a picture of the individual's face, a fingerprint scan, retinal scan, or a voice signature. In such instances, quick and quiet identification methods might be preferred, such as a fingerprint scan or a picture of the individual's face. In situations where a hostile may use duress to acquire the biometric identification of another for logging in to the VPN, authentication may be further verified by data from electronic devices external to the mobile device, such as by using footage of the user holding the mobile device taken by a security camera to ensure that the identity of logged-in user is correct.

At 210, the emergency communication management program 110A, 110B analyzes electronic device data to identify information at the first location. Electronic device data may include data entered into mobile devices by users, positional or other data received from users' mobile devices, sensor data such as camera feeds, microphone feeds, status changes (for instance, loss of sensor feeds, loss of mobile device connections), and pre-supplied data such as the location and capabilities of sensors or the structural layout of the emergency area. Information may, for instance, include any facts relevant to the resolution of an emergency. For example, the condition and/or location of casualties, the location/armament/identity of possible hostiles, the location and sound profiles of detected noises indicative of an emergency the location and/or magnitude of flames, the location of gas, the location of escape points, the location and/or severity of structural damage, the location and/or identity of possible civilians or hostages, escape paths, potential hiding places, location of first responders, et cetera. This information may be identified from electronic device data via analysis. Where there is not enough data for information to be established as fact, emergency communication management program 110A, 110B may infer based on a likelihood established through the quantity and quality of data available. For instance, in an area where multiple sensor feeds or mobile device connections are lost within a short time, emergency communication management program 110A, 110B may infer the presence of fire or hostile activity. In another case where a hostile is among civilians, emergency communication management program 110A, 110B may infer which individual is most likely to be the hostile from data such as security camera footage, mobile device logins in the area, et cetera. In some embodiments, a probability threshold may be established or pre-supplied to emergency communication management program 110A, 110B, which an inference must meet or exceed for emergency communication management program 110A, 110B to make the inference. In some embodiments of the invention, the accuracy of inferred information in past cases may be taken into account by emergency communication management program 110A, 110B when assigning likelihood scores to inferences and/or in refining the probability threshold. In other embodiments of the invention, emergency communication management program 110A, 110B does not make inferences, but identifies the multiple possible inferences based on available information and their respective likelihood scores. For instance, the likelihood that an unresponsive individual in a room without a camera feed is a hostile or a casualty.

At 212, the emergency communication management program 110A, 110B communicates information to users. The emergency communication management program 110A, 110B may communicate information to the mobile devices of users, such as by popup maps, text or auditory messages, or visualizations. The emergency communication management program 110A, 110B may also communicate information to users using a virtual assistant. In embodiments where the virtual assistant communicates via audible speech, use of the virtual assistant may be restricted to first responders, or first responders with headsets, in cars, or locations remote from the scene of the emergency, as auditory instruction may not be desirable at the site of the emergency. In embodiments where the virtual assistant communicates via text, the virtual assistant may communicate with all users, or be restricted to a subset. The emergency communication management program 110A, 110B may also communicate information to users via a heads-up display, for instance by overlaying information such as the locations of casualties, friendlies, possible dangers, and other first responders over the vision of a first responder. This may be achieved via augmented-reality headsets or other displays. In communicating information to electronic devices, emergency communication management program 110A, 110B may segregate devices into different classes, and may modify message content based on the class of device. For example, in the case of an emergency in a school, the mobile devices logged into the VPN may be classed as teachers and children based on the identity of the user gained for instance through identification information; electronic devices classed as belonging to teachers may be sent messages communicating information on escape routes, advice, location of danger, et cetera, while electronic devices classed as belonging to children may communicate more simple information such as to remain calm, listen to teachers, et cetera. Other classes for mobile devices may include casualties and first responders. If an electronic device is identified or inferred to be owned or accessed by a hostile, misleading messages may be sent to that device, or no messages at all. In some embodiments, the compromised device may be disconnected from the network, and in other embodiments the compromised device may be kept connected in order to obtain any possible data from the device. Electronic devices may also be segregated based on interfacing requirements or class/type/function of device. For instance, electronic devices such as sensors or will have different communications formats than devices interfacing with human users, and have different information requirements.

It may be appreciated that FIG. 2 provides only an illustration of one implementation and does not imply any limitations with regard to how different embodiments may be implemented. Many modifications to the depicted environments may be made based on design and implementation requirements. For instance, in some embodiments, emergency communication management program 110A, 110B may prompt signed-in mobile devices on the VPN for verification of the user's medical status, at intervals either regular or prompted by external information (such as camera footage, or audio profiles potentially corresponding with violent acts). The emergency communication management program 110A, 110B may additionally prompt electronic devices of logged-in individuals for further information pertaining to the emergency event, such as the location of fires/casualties/hostiles, number of other individuals present, et cetera.

Figure 3:
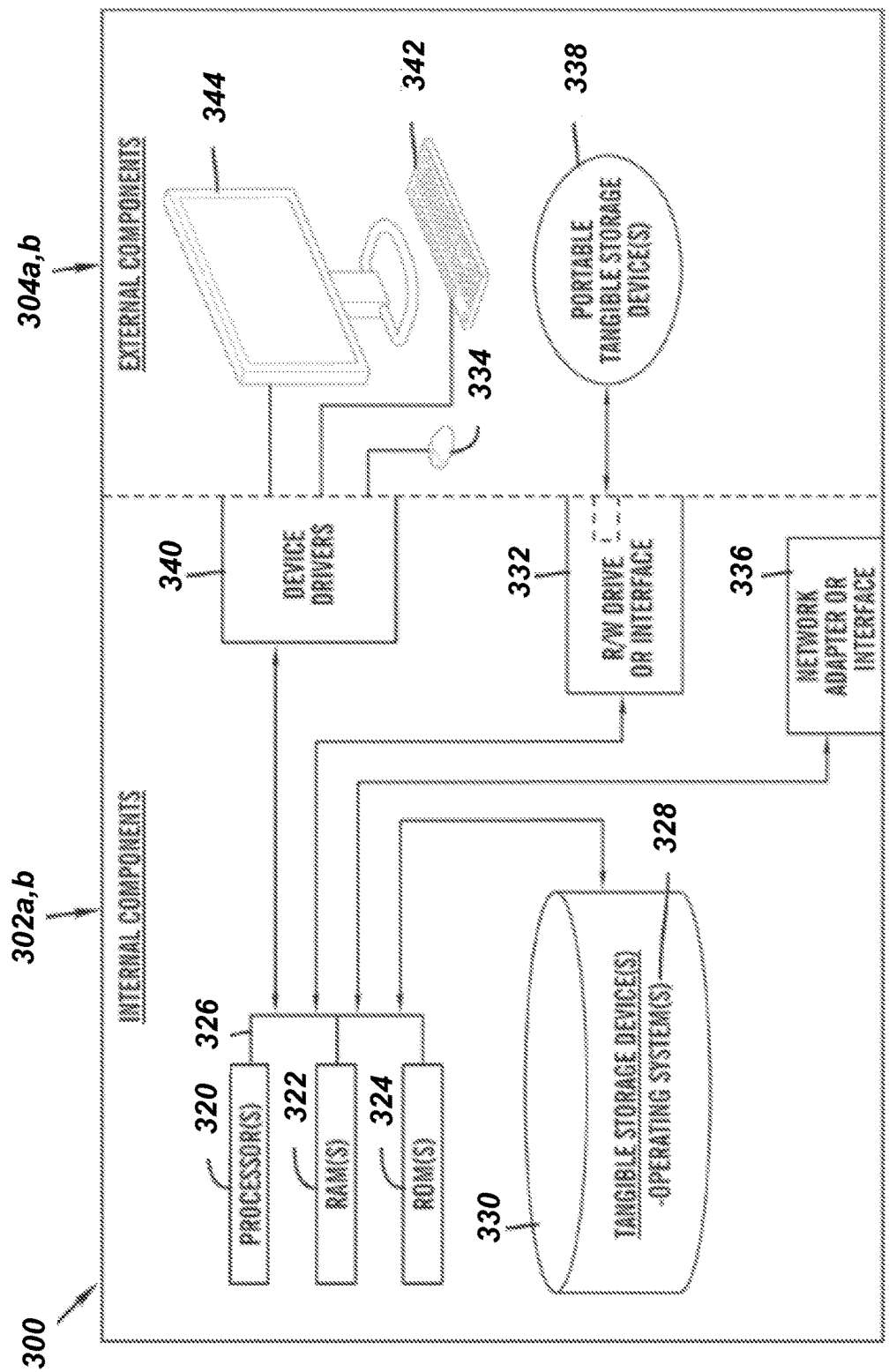
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328 and the emergency communication management program 110A in the client computing device 102, and the emergency communication management program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the emergency communication management program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The emergency communication management program 110A in the client computing device 102 and the emergency communication management program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the emergency communication management program 110A in the client computing device 102 and the emergency communication management program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
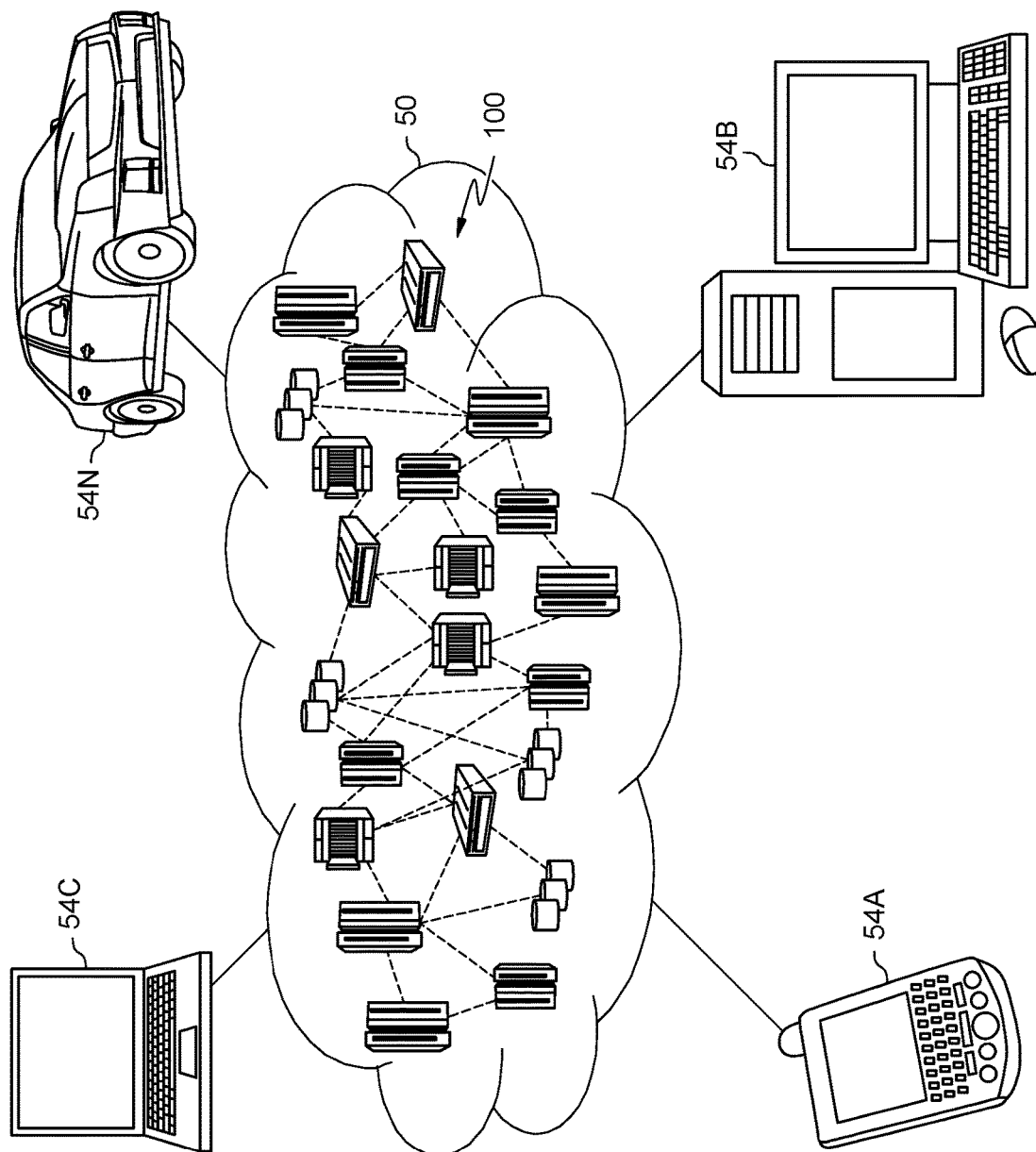
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
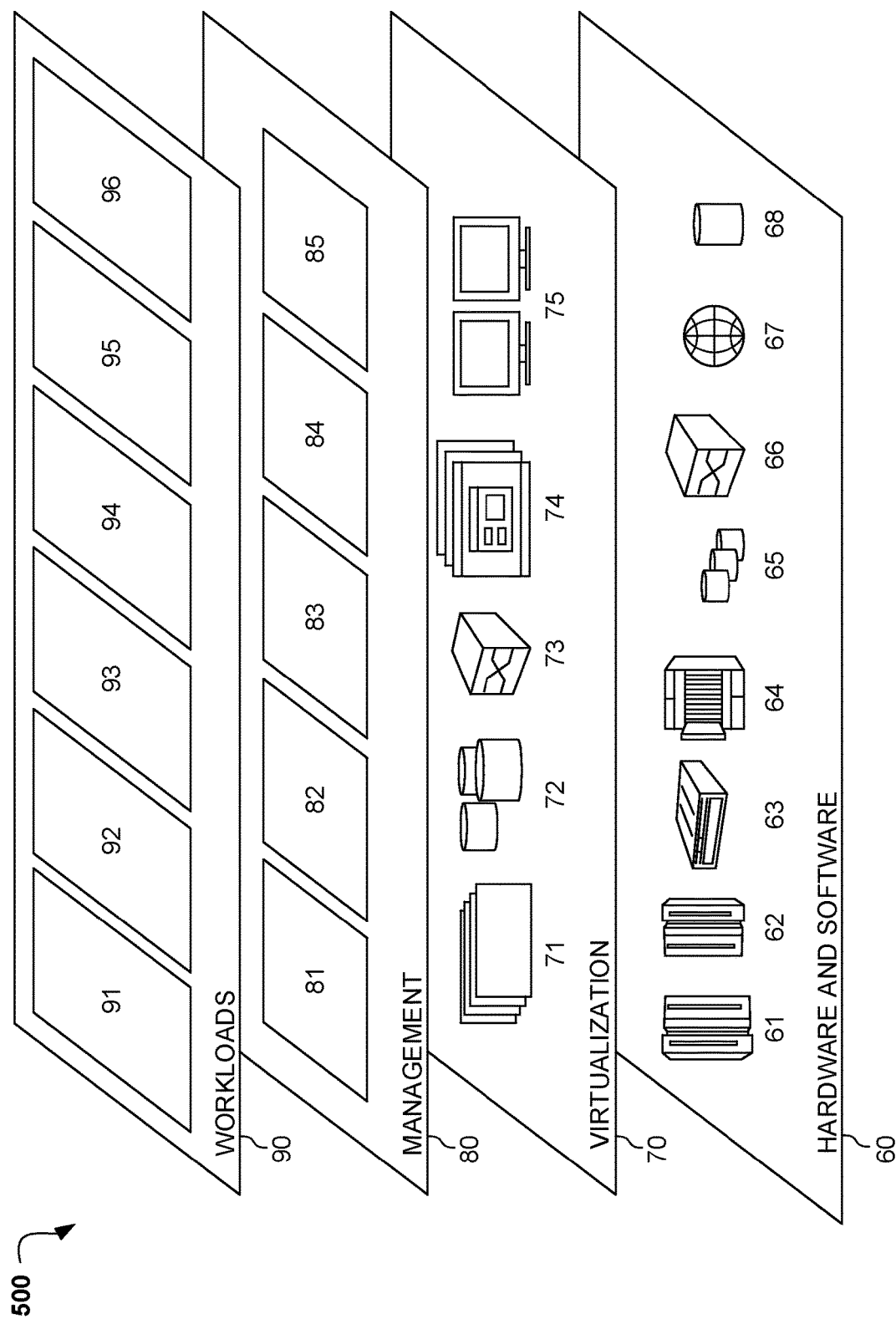
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and emergency communication management 96. emergency communication management 96 may relate to replacing local public networks with a localized temporary network that allows efficient intercommunication between affected individuals, on-site devices and sensors, and emergency responders during an emergent event, as well as denying communications to potential hostile actors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing electronic devices connected to a communications channel, the method comprising:
    responsive to detecting an emergency at an emergency location, disabling all public communications networks available at the emergency location;
    connecting a plurality of electronic devices to a virtual private network (VPN) established at the emergency location;
    identifying one or more individuals associated with at least one of the plurality of electronic devices as potential hostiles and potential casualties based on sensor data from at least one of the electronic devices; and
    communicating one or more messages to the plurality of electronic devices responsive to separating the one or more of the plurality of electronic devices into one or more classes based on the identifying, a type of an electronic device of the plurality of electronic devices, and the sensor data, and wherein the classes comprise first responders, potential hostiles, and potential casualties.

2. The method of claim 1, the disabling further comprising:
    jamming, using signal jammers, the at least one public communications network.
3. The method of claim 1, further comprising:
    responsive to identifying a compromised electronic device of the plurality of electronic devices as owned or accessed by a hostile, sending one or more misleading messages to the compromised electronic device.
4. The method of claim 1, further comprising:
    authenticating an electronic device using sensor data from two or more electronic devices external to the electronic device.
5. The method of claim 1, further comprising:
    responsive to the sensor data, prompting one or more of the plurality of electronic devices for the user's medical status.
6. A computer system for managing electronic devices connected to a communications channel, the computer system comprising:
    one or more wireless network hubs, one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        responsive to detecting an emergency at an emergency location, disabling all public communications networks available at the emergency location;
        connecting a plurality of electronic devices to a virtual private network (VPN) established at the emergency location;
        identifying one or more individuals associated with at least one of the plurality of electronic devices as potential hostiles and potential casualties based on sensor data from at least one of the electronic devices; and
        communicating one or more messages to the plurality of electronic devices responsive to separating the one or more of the plurality of electronic devices into one or more classes based on the identifying, a type of an electronic device of the plurality of electronic devices, and the sensor data, and wherein the classes comprise first responders, potential hostiles, and potential casualties.
7. The computer system of claim 6, the disabling further comprising:
    jamming, using signal jammers, the at least one public communications network.
8. The computer system of claim 6, further comprising:
    responsive to identifying a compromised electronic device of the plurality of electronic devices as owned or accessed by a hostile, sending one or more misleading messages to the compromised electronic device.
9. The computer system of claim 6, further comprising:
    authenticating an electronic device using sensor data from two or more electronic devices external to the electronic device.
10. The computer system of claim 6, further comprising:
    responsive to the sensor data, prompting one or more of the plurality of electronic devices for the user's medical status.
11. A computer program product for managing electronic devices connected to a communications channel, the computer program product comprising a non-transitory computer readable storage medium having program instructions embodied therewith, the program instructions executable by a computer to cause the computer to perform a method comprising:
    responsive to detecting an emergency at an emergency location, disabling all public communications networks available at the emergency location;
    connecting a plurality of electronic devices to a virtual private network (VPN) established at the emergency location;
    identifying one or more individuals associated with at least one of the plurality of electronic devices as potential hostiles and potential casualties based on sensor data from at least one of the electronic devices; and
    communicating one or more messages to the plurality of electronic devices responsive to separating the one or more of the plurality of electronic devices into one or more classes based on the identifying, a type of an electronic device of the plurality of electronic devices, and the sensor data, and wherein the classes comprise first responders, potential hostiles, and potential casualties.
12. The computer program product of claim 11, further comprising:
    jamming, using signal jammers, the at least one public communications network.
13. The computer program product of claim 11, further comprising:
    responsive to identifying a compromised electronic device of the plurality of electronic devices as owned or accessed by a hostile, sending one or more misleading messages to the compromised electronic device.
14. The computer program product of claim 11, further comprising:
    authenticating an electronic device using sensor data from two or more electronic devices external to the electronic device.
15. The computer program product of claim 11, further comprising:
    responsive to the sensor data, prompting one or more of the plurality of electronic devices for the user's medical status.

* * * * *